US012069184B2

(12) United States Patent
Liu (10) Patent No.: US 12,069,184 B2
(45) Date of Patent: Aug. 20, 2024

(54) EMBEDDED MMC DEVICE WITH SECURE BOOT UPDATES BY LOADING GOLDEN BOOT IMAGE FROM WRITE-PROTECTED PARTITION AND VALIDATING SELF-RECOVERY USING PUBLIC KEY

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 174 days.

(21) Appl. No.: 17/554,370

(22) Filed: Dec. 17, 2021

(65) Prior Publication Data

US 2023/0198775 A1    Jun. 22, 2023

(51) Int. Cl.
| | | |
|---|---|---|
| *H04L 9/32* | (2006.01) | |
| *G06F 3/06* | (2006.01) | |
| *G06F 9/4401* | (2018.01) | |
| *G06F 21/57* | (2013.01) | |
| *H04L 9/30* | (2006.01) | |

(52) U.S. Cl.
CPC .......... *H04L 9/3247* (2013.01); *G06F 3/0604* (2013.01); *G06F 3/0632* (2013.01); *G06F 3/0644* (2013.01); *G06F 3/0679* (2013.01); *G06F 9/4411* (2013.01); *G06F 21/575* (2013.01); *H04L 9/30* (2013.01); *G06F 2221/034* (2013.01)

(58) Field of Classification Search
CPC .... G06F 3/0604; G06F 3/0632; G06F 3/0644; G06F 3/0679; G06F 9/4411; G06F 21/575; H04L 9/30
See application file for complete search history.

(56) References Cited

U.S. PATENT DOCUMENTS

| | | | | |
|---|---|---|---|---|
| 7,143,275 B2* | 11/2006 | Cepulis | ............... | G06F 11/1417 |
| | | | | 714/36 |
| 9,575,840 B1* | 2/2017 | Spangler | ............. | G06F 11/1417 |
| 10,331,578 B2* | 6/2019 | Arora | ...................... | G06F 21/62 |
| 11,216,597 B2* | 1/2022 | Alon | ...................... | G06F 21/575 |
| 11,880,313 B2* | 1/2024 | Lee | ...................... | G06F 12/1466 |
| 2014/0189335 A1* | 7/2014 | Liu | ...................... | G06F 11/1433 |
| | | | | 713/2 |
| 2020/0250313 A1* | 8/2020 | Li | ........................ | G06F 11/1004 |
| 2021/0081536 A1* | 3/2021 | Zhang | ........................ | G06F 8/65 |
| 2022/0179962 A1* | 6/2022 | Lambert | ............... | G06F 15/177 |

FOREIGN PATENT DOCUMENTS

WO    WO-2022044664    *  3/2022    ............. G06F 21/57

* cited by examiner

*Primary Examiner* — Tammara R Peyton
(74) *Attorney, Agent, or Firm* — Greenberg Traurig (57) ABSTRACT

The example embodiments relate to improvements in managing boot code images. In an embodiment, a device is disclosed comprising a memory device, the memory device including a storage array, the storage array comprising a first partition and a second partition, wherein the first partition comprises a writeable partition and the second partition comprises a write-protected partition; and a processor configured to: load a golden boot image from the second partition, display a boot prompt after loading the golden boot image, receive an update boot image, the update boot image including a signature, read a public key from the second partition, validate the signature using the public key, and replace a current boot image stored in the first partition with the update boot image.

20 Claims, 7 Drawing Sheets

EMBEDDED MMC DEVICE WITH SECURE BOOT UPDATES BY LOADING GOLDEN BOOT IMAGE FROM WRITE-PROTECTED PARTITION AND VALIDATING SELF-RECOVERY USING PUBLIC KEY

FIELD OF THE TECHNOLOGY

The example embodiments are directed toward memory devices and, in particular to techniques for managing boot images.

BACKGROUND

Currently, memory devices such as Embedded MultiMediaCard (eMMC) devices allow users to update boot code images via a boot prompt. However, such systems do not support any type of validation of replacement boot code images. Thus, boot code images (especially remotely sourced images) can be tampered with prior to installation. If the active boot image is compromised, then all future updates cannot be trusted since the boot code managing updates is compromised itself.

DETAILED DESCRIPTION

In the various example embodiments provided below, techniques for securely updating a boot image are provided. A storage medium (e.g., a memory device) is configured with a write-protected region storing a golden boot image and a public key. A second writeable region stores an active boot loader. In response to entering a secure boot mode (e.g., via keypress on boot), a user can switch to utilize the golden boot loader and proceed to attempt to replace the active boot loader with an updated boot loader. The golden boot code is configured to validate any requested update images using the public key, which is tamper-proof, as well as using a version numbering constraint. If either the constraint or key validation fails, the example embodiments support rollback the update procedure and revert to the current boot scheme.

Figure 1:
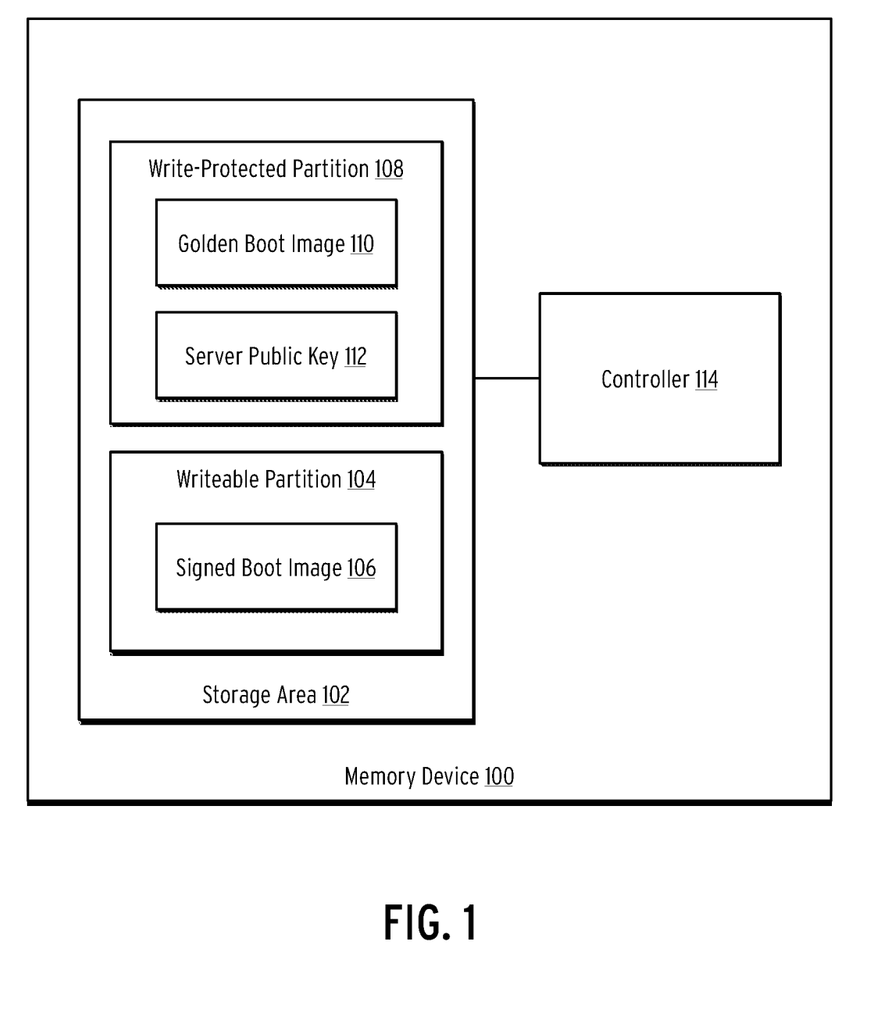
FIG. 1 is a block diagram illustrating a memory device according to some of the example embodiments.

FIG. 1 is a block diagram illustrating a memory device according to some of the example embodiments.

In the illustrated embodiment, a memory device 100 can include a controller 114 and storage area 102. The storage area 102 can include a writeable partition 104 (also referred to as the "first partition") and a write-protected partition 108 (also referred to as the "second partition"). As illustrated, the writeable partition 104 can include a signed boot image 106. Similarly, the write-protected partition 108 can include a golden boot image 110 and a server public key 112. In some embodiments, the memory device 100 can include an eMMC device.

In the illustrated embodiment, the controller 114 can include a microcontroller, microprocessor, application-specific integrated circuit (ASIC), field-programmable gate array (FPGA), or similar processing element. In some embodiments, controller 114 can perform various operations to access data stored in storage area 102. In some embodiments, controller 114 can communicate with a host processor (not illustrated) and provide data stored in storage area 102 to the host processor. Details of communications between a host processor and the memory device 100 are provided in FIG. 5. As one example, storage area 102 can include boot code images for use in starting a computer system (such as that depicted in FIG. 6). As used herein, a boot code image refers to a software image run during the startup of a computing system. In some embodiments, the boot code image can include a boot loader or similar early-stage code. In some embodiments, the boot code image can include a secure boot loader such as Das U-Boot created and maintained by DENX Software Engineering GmbH of Grobenzell, Germany. Other boot loading technologies may be used.

In the illustrated embodiment, a storage area 102 is partitioned into two regions: writeable partition 104 and write-protected partition 108. The storage area 102 can be partitioned into more regions (not illustrated), and no limit is placed on the number of additional partitions or their properties.

In the illustrated embodiment, writeable partition 104 can include a writeable partition. As used herein, a writeable partition refers to a partition that may be written to (and read from) by a non-privileged user. In some embodiments, non-privileged users can include any user while, in some embodiments, non-privileged users can include only a subset of users (e.g., users of an operating system with root privileges). By contrast, write-protected partition 108 comprises a write-protected region. In some embodiments, a write-protection region comprises a region of memory that may only be written to by privileged users. In some embodiments, all users may read data from the write-protected partition 108. As used herein, a privileged user refers to a user with write permission to the write-protected partition 108. Specifically, in an embodiment, a privileged user can include a user that has access to a private key corresponding to the server public key 112. For example, a privileged user can include a manufacturer of the memory device 100. As will be discussed in FIG. 2, a manufacturer can manually designate the write-protected partition 108 as write-protected during manufacturing via a physical jumper or similar structure. In other embodiments, write protection can be enabled programmatically.

Prior to setting write-protected partition 108 as write-protected, the manufacturer can write the golden boot image 110 and server public key 112 to the write-protected partition 108. In the illustrated embodiment, the golden boot image 110 can include a base boot image that is guaranteed to be secure. In some embodiments, the golden boot image 110 can include a boot image that implements a basic or standard system initialization routine (e.g., network and memory access) and a secure update command (described in more detail herein). Thus, the golden boot image 110 provides the bare minimum functionality to bring a system online and is less susceptible to corruption or attack.

The write-protected partition 108 additionally stores a server public key 112. In an embodiment, the server public key 112 can include a public key portion of an asymmetric key pair. Various asymmetric key generation algorithms such as Rivest-Shamir-Adleman (RSA) or Elliptic Curve Cryptography (ECC) can be used to generate key pairs, and the disclosure does not limit the specific algorithm used. In an embodiment, a manufacturer of the memory device 100 generates an asymmetric key pair when manufacturing the device and writes the server public key 112 portion of the key pair to the write-protected partition 108 prior to enabling write protection on the write-protected partition 108. Further, the manufacturer can write the golden boot image 110 to the write-protected partition 108 prior to enabling write protection. After writing both golden boot image 110 and server public key 112, the manufacturer can enable write protection to secure the data written to write-protected partition 108. As discussed, in some embodiments, this data may not be static and unchangeable throughout the life of the memory device 100. In other embodiments, only the holder of the private key corresponding to server public key 112 may be capable of writing to the write-protected partition 108. In such an embodiment, the holder of the private key may issue a signed command to controller 114, which temporarily disables write protection of the write-protected partition 108 and allows for updates to the golden boot image 110 or server public key 112 or other data stored in write-protected partition 108. After completing the update, the holder of the private key can sign a command to re-enable write protection and issue such a command to controller 114 to re-enable protection of the write-protected partition 108. In some embodiments, write-protected partition 108 can include multiple write-protected partitions, and golden boot image 110 can be written to one write-protected partition while server public key 112 can be written to a different write-protected partition.

In contrast to write-protected partition 108, the writeable partition 104 is freely writable by parties other than the holder of the private key corresponding to server public key 112. For example, users may manually update the signed boot image 106 during the operation of the memory device 100. In some embodiments, a computing system can be configured to boot directly from signed boot image 106 by default, thus allowing users to boot from their own boot code (in contrast to golden boot image 110). Notably, however, in some embodiments, the system may require that the signed boot image 106 be signed with the private key corresponding to the server public key 112. That is, the holder of the private key corresponding to the server public key 112 must still be the deliverer of the signed boot image 106 despite the signed boot image 106 being writeable by any user.

Various details of booting a computing system equipped with memory device 100 are described below in the following flow diagrams.

Figure 2:
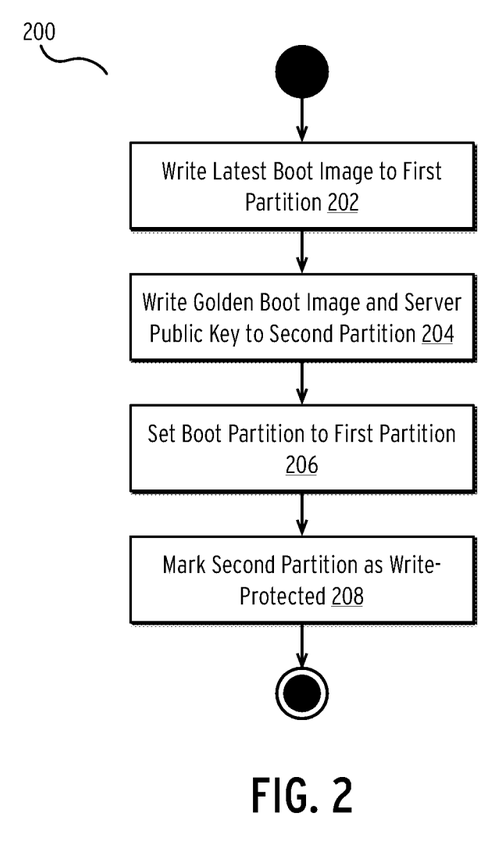
FIG. 2 is a flow diagram illustrating a method for initializing a storage array of a memory device according to some of the example embodiments.

FIG. 2 is a flow diagram illustrating a method 200 for initializing a storage array of a memory device according to some of the example embodiments. In some embodiments, method 200 can be executed by a manufacturer during the manufacturing of a memory device, such as memory device 100. That is, a manufacturer can execute method 200 in a secure production facility while all storage locations of the memory device 100 are available for writing.

In block 202, method 200 can include writing the latest boot image to a first partition. In an embodiment, the first partition can include the writeable partition 104 of FIG. 1. In an embodiment, the latest boot image can include any boot image (e.g., secure boot image) desired to be a default boot image for the memory device storing the first partition. In some embodiments, the latest boot image can include a golden boot image; however, in most embodiments, the latest boot image will comprise a more fully-featured boot image. In general, any image comprising a boot loader or similar boot image can be used. In some embodiments, the latest boot image can be signed by the operator of method 200 (e.g., a manufacturer) using a private key (corresponding to a server public key, as discussed next).

In block 204, method 200 can include writing a golden boot image and a server public key to a second partition. In an embodiment, the first partition can include the write-protected partition 108 of FIG. 1. In one embodiment, the golden boot image can include golden boot image 110 as discussed in FIG. 1. In brief, the golden boot image can include a reduced complexity boot loader image that allows for system initialization and a prompt or other interface allowing for updates to the boot loader code of a computing device. Additionally, method 200 can write a server public key to the second partition. As discussed above in FIG. 1, the server public key can include a public key portion of an asymmetric key pair (e.g., RSA or ECC key pair) that the operator of the method 200 generates (e.g., during manufacturing). As in block 202, in some embodiments, block 204 can include signing the golden boot image with the private key corresponding to the server public key.

In block 206, method 200 can include setting the boot partition as the first partition. As used herein, a boot partition refers to a designated partition that is first accessed when a device boots up. In general, a computing system will request the data stored beginning at the first location in the boot partition to load a boot image and execute the boot image. In block 206, method 200 sets the first partition (which includes the latest boot image) as the boot partition. Thus, when a computing device that uses the memory device operated on in method 200 boots, it will request the latest boot image during startup. Details of such a startup are provided in the description of FIG. 3.

In block 208, method 200 can include marking the second partition as write-protected. As discussed in FIG. 1, during manufacturing, the entire storage array of a memory device may be writeable. Thus, after method 200 executes block 204, method 200 can set the second partition as read-only (i.e., write-protected). In some embodiments, block 208 can include physically altering the memory device to enable write protection (e.g., changing a jumper or fuse) or may comprise instructing a controller of the memory device to prevent writing to one or more locations or partitions. In some embodiments, method 200 can include writing the golden boot image and server public key to a one-time programmable (OTP) memory, and thus block 208 may be omitted in such an embodiment. However, when controller-implemented write-protection of standard memory partitions is used, the method 200 can programmatically enable and disable write protection (e.g., based on a command signed with the private key corresponding to the server public key), which enables secure updates to the golden boot image and server public key.

Once method 200 finishes, the memory device, including the first and second partitions, may be released to manufacturing and provided to end-users or customers. As discussed, the memory device may be installed in a computing system and used as a storage device for the system (e.g., an eMMC). As such, when the computing system boots, the computing system will access the memory device and attempt to load a boot image. Since the first partition is set as the boot partition, any such computing device will load the currently installed boot image in the first partition. When first powered on, this latest currently installed boot image will comprise the latest boot image as specified by the manufacturer. However, as will be discussed, the currently installed boot image can include a different boot loader updated after the memory device is released to manufacturing.

Figure 3:
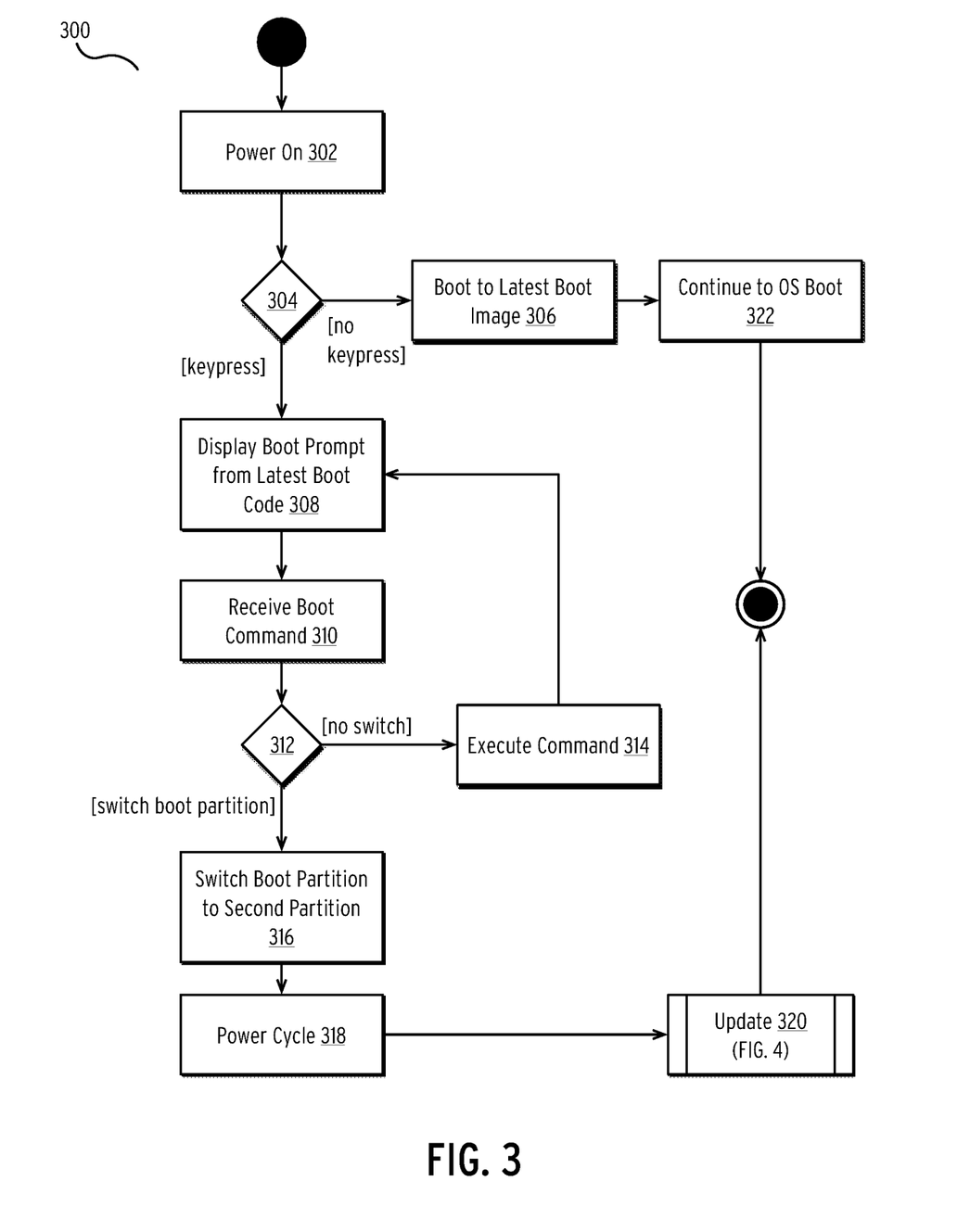
FIG. 3 is a flow diagram illustrating a method for initiating a boot code update of a memory device according to some of the example embodiments.

FIG. 3 is a flow diagram illustrating a method 300 for initiating a boot code update of a memory device according to some of the example embodiments. In some embodiments, method 300 can be executed by a computing system equipped with the memory device 100.

In block 302, method 300 can include powering on a computing system. In some embodiments, block 302 can further comprise powering on the memory device 100 along with other components of the computing system.

In block 304, method 300 can include determining if a predefined keypress was entered. In some embodiments, method 300 can monitor for any keypress. In an embodiment, method 300 can monitor for a keypress of a designated key (e.g., the escape key).

In block 306, method 300 can include booting to the latest boot image upon not detecting a keypress. In one embodiment, method 300 can perform block 306 by reading a boot image from a memory device at a first bootable location. In an embodiment, this first bootable location can include the first partition discussed in FIG. 2. In response to a request for a boot image, the memory device returns the latest boot image stored in the first partition, and the computing system can load the boot image into memory and execute the latest boot image.

In block 322, method 300 continues to boot normally if method 300 does not detect a keypress in block 306. In an embodiment, method 300 can execute the latest boot image and initialize the system and then pass control to a second-stage bootloader to continue booting. In some embodiments, the latest boot image can pass control directly to an operating system (OS). In some embodiments, multiple-stage bootloaders may be executed in sequence, and the specific arrangement of bootloaders, and the OS, are not limiting. As illustrated, after method 300 continues to boot to the OS, method 300 ends. After method 300 ends, the computing system is fully booted.

If method 300 detects a keypress in block 304, method 300 can display a boot prompt using the latest boot code in block 308. The latest boot code refers to an executing copy of the latest boot image read from the first partition. In an embodiment, the boot prompt can include a terminal-based interface. In other embodiments, the boot prompt can include a graphical user interface (GUI). In either embodiment, the boot prompt allows a user to enter boot commands. In one embodiment, the available boot commands can include a switch command. The switch command can allow for switching between the latest boot image and the golden boot image. Specifically, the switch command can allow for changing the boot partition from the first partition to the second partition. Certainly, other boot commands may be issued via the boot prompt. The disclosure is not limited to only switch commands.

In block 310, method 300 can include receiving a boot command. The boot command can include a switch command or other commands. The disclosure does not detail such other commands and does not limit the types of other commands.

In an embodiment, the switch command can include a single command. In other embodiments, the switch commands can include a sequence of commands executed in a specified order. For example, a switch command can be implemented with existing boot code commands such as:

| mmc | partconf | 0 | 1 | 2 | 1 |
| mmc | bootbus | 0 | 1 | 0 | 0 |

In the above example, the switch command is implemented as two invocations of the mmc command in a Das U-Boot boot loader. The first mmc command executes the subcommand partconf which changes the configuration of the partition map of the memory device to use the second (2) partition. The second mmc command executes the bootbus subcommand, which configures the boot bus width. In an embodiment, the commands are persistent across power cycles until changed. Reference can be made to documents of the mmc command in Das U-Boot for further detail. When implemented as a single command, the switch command can be configured as a shell script to simulate individual native command executions.

In block 312, method 300 determines which type of command was received. If the command is not a switch command, method 300 proceeds to block 314 and executes the command according to the latest boot code image. Details of the normal execution of boot commands are not provided herein.

If method 300 determines that a switch command was entered in block 312, method 300 proceeds to block 316, where it switches the boot partition to the second partition. As described above, block 316 may comprise executing the switch commands entered via the prompt (e.g., the two mmc commands). Continuing the previous example, the partconf subcommand, when executed, may cause the switch of the boot partition. In other embodiments, the single switch command, when executed, may cause the switch of the boot partition.

In block 318, method 300 power cycles the device. In some embodiments, a user can manually initiate a power cycle by issuing, for example, a reset command via the boot prompt. In other embodiments, the switch command itself may automatically power cycle the computing system.

Upon power cycling, method 300 then enables a secure update procedure in block 320. Further details of this procedure are provided in FIG. 4. Once the update procedure is complete and method 300 can end.

Figure 4:
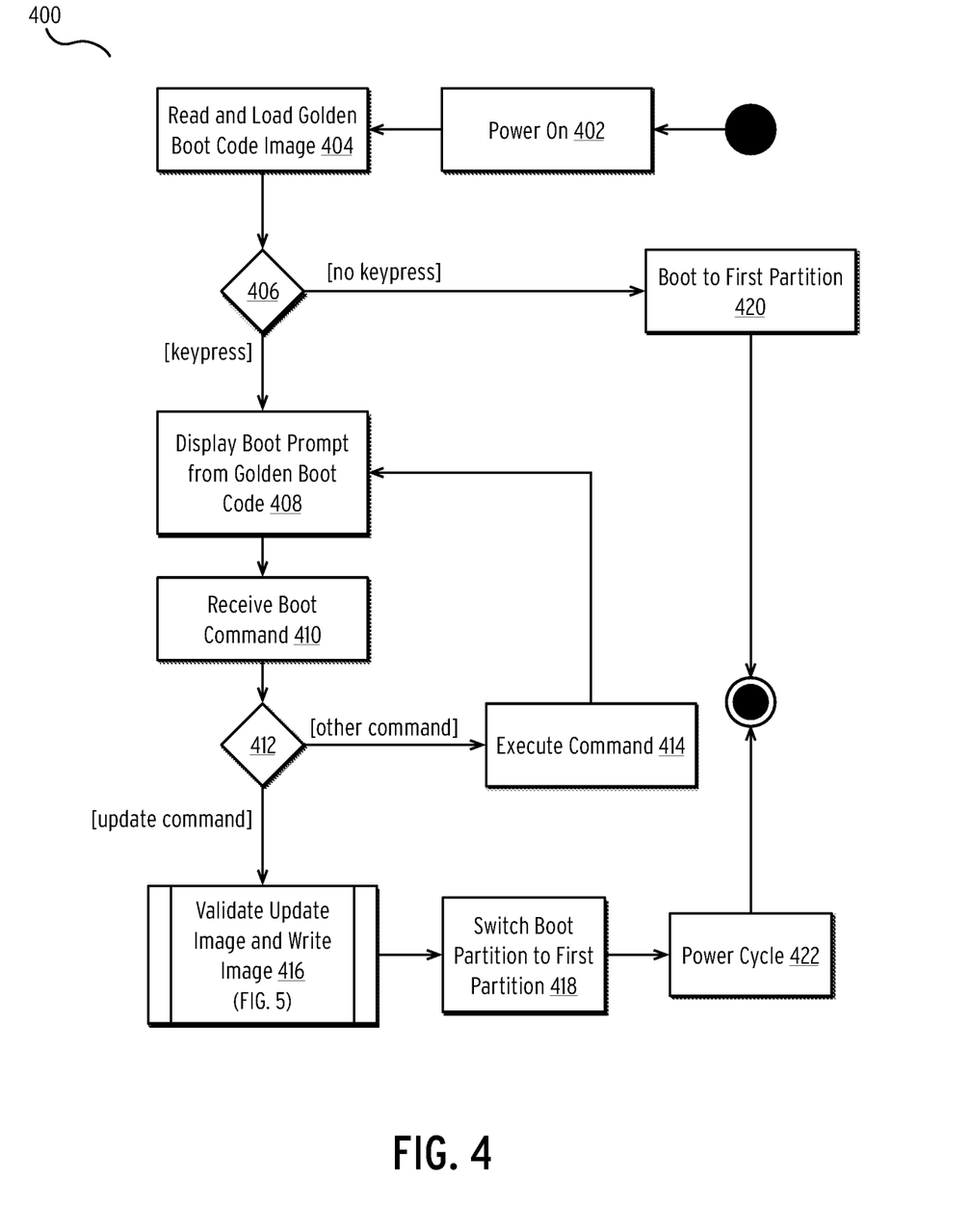
FIG. 4 is a flow diagram illustrating a method for updating the boot code of a memory device according to some of the example embodiments.

FIG. 4 is a flow diagram illustrating a method 400 for updating the boot code of a memory device according to some of the example embodiments.

In block 402, method 400 can include powering on a computing system. In some embodiments, block 402 can further comprise powering on the memory device 100 along with other components of the computing system. In the illustrated embodiment, method 400 executes block 402 after changing a boot partition of the memory device and power cycling the computing system, as described in block 316 and block 318 of FIG. 3.

In block 404, method 400 can include reading and loading the golden boot code image. In an embodiment, the golden boot code image is stored on the second partition, and thus when method 400 boots, it automatically reads the golden boot code image and executes the golden boot code image.

In block 406, method 400 can include determining if a predefined keypress was entered. In some embodiments, method 400 can monitor for any keypress. In an embodiment, method 400 can monitor for a keypress of a designated key (e.g., the escape key).

If method 400 does not detect a keypress, method 400 can next boot from the first partition in block 420. In an embodiment, the golden boot code image is configured to automatically transfer control to any boot loader stored in the first partition. Thus, method 400 can include automatically booting to the first partition if method 400 does not detect a keypress. In one embodiment, as part of block 404, the golden boot code image can validate a signature associated with the boot code image stored in the first partition. In some embodiments, method 400 can validate the signature using the server public key stored in the second partition. If method 400 cannot validate the signature, method 400 can abort and display an error. In other embodiments, if method 400 cannot validate the signature, method 400 can then proceed to block 408 instead of aborting.

If method 400 detects a keypress, method 400 can display a boot prompt provided by the golden boot code running from the golden boot code image. In some embodiments, the golden boot code includes a secure update command (described in more detail in FIG. 5) which enables secure boot code updates. In other respects, the boot prompt can be substantially similar to the boot prompt associated with the latest boot code (e.g., a Das U-Boot prompt).

In block 410, method 400 can include receiving a boot command. The boot command can include a secure update command or other commands. The secure update command can allow for updating the latest boot code to a new version and validating the new version. The disclosure does not detail such other commands and does not limit the types of other commands.

In an embodiment, the secure update command allows a user to specify a new boot image. The computing system can then use this new boot image to update the latest boot image to the new boot image. In an embodiment, the secure update command comprises a terminal command. In an embodiment, the secure update command accepts a local filename as an argument (e.g., a locally stored boot image) or a remote address of a boot image. If a user supplies a remote address, the secure update command can load the remote boot image via a network protocol. In an embodiment, the network protocol can include a Trivial File Transfer Protocol (TFTP). In some embodiments, the secure update command can accept the same update commands as a standard update command (e.g., an update command in a Das U-Boot system).

In block 412, method 400 determines which type of command was received. If the command is not a secure update command, method 400 proceeds to block 414 and executes the command according to the golden boot code image. Details of the normal execution of boot commands are not provided herein.

If method 400 determines that a secure update command was entered in block 412, method 400 proceeds to block 416, where it validates the new boot image and writes the new boot image. Details of this process are described in FIG. 5 and are not repeated herein.

Once method 400 validates the requested update boot code image, method 400 can switch the boot partition to the first partition that includes the update boot code image in block 418. In one embodiment, the switch command (described in FIG. 3), or sequence of commands, can be used to switch the boot partition in block 418. In some embodiments, the use of the switch command can be performed automatically as part of the update command. In other embodiments, the user may manually enter the switch command.

In block 422, method 400 power cycles the device. In some embodiments, a user can manually initiate a power cycle by issuing, for example, a reset command via the boot prompt. In other embodiments, the secure update command itself may automatically power cycle the computing system. After power cycling, method 400 can end. In some embodiments, upon restarting, the computing system can execute method 300 as a regular boot routine, thus enabling entry to method 400 on-demand.

Figure 5:
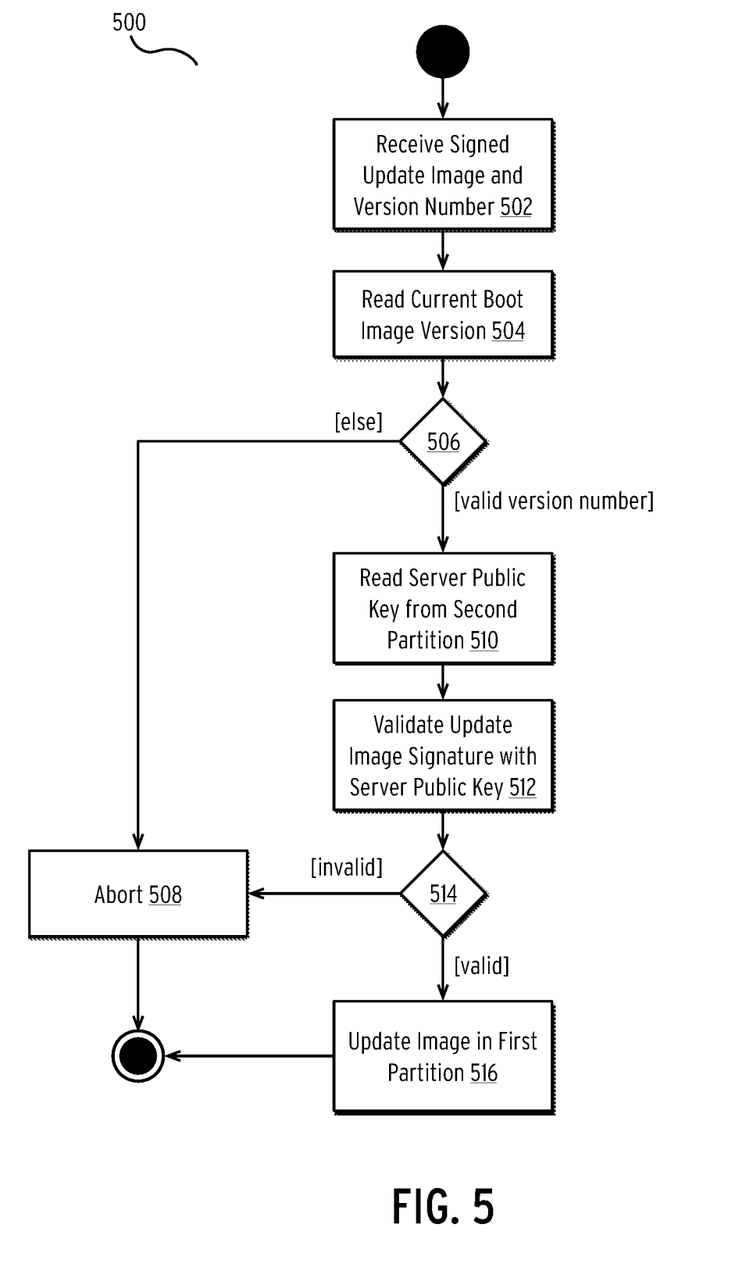
FIG. 5 is a flow diagram illustrating a method for validating a boot code update in a memory device according to some of the example embodiments.

FIG. 5 is a flow diagram illustrating a method 500 for validating a boot code update in a memory device according to some of the example embodiments.

In block 502, method 500 can include receiving a signed update image and a version number. In an embodiment, the signed update image can be read locally from a storage device or retrieved from a remote location. In an embodiment, the signed update image is associated with a digital signature. In an embodiment, this digital signature can be generated using the private key of a server, or other remote computing devices. In an embodiment, a memory device includes a corresponding public key stored in a write-protected region of memory. In an embodiment, the signature can be computed by hashing the update image and computing a signature using the hash. In some embodiments, the signature can be generated by concatenating the hash with the version number and computing the signature on the concatenation. In some embodiments, the version number comprises a number conforming to a preconfigured version numbering scheme. For example, a semantic version scheme can be used. Alternatively, the version numbering scheme can comprise an incrementing version number.

In block 504, method 500 can include reading a current version number of the latest boot code image stored in the first partition. In one embodiment, the current version number can be stored in a preconfigured location in the boot code image (e.g., a certain byte offset of the boot code image). In another embodiment, the current version can be maintained in a separate location (e.g., configuration register or other location).

In block 506, method 500 can comprise determining if the version number received in block 502 is valid given the current version number read in block 504. In an embodiment, method 500 can perform block 506 by determining if the current version number is less than the version number received in block 502. Other techniques can be used. For example, a version number can comprise an irreversible hash of the previous version. Thus, in such an embodiment, method 500 can compute the hash of the current version and determine if the hash is equal to the version number received in block 502. Other schemes (e.g., semantic version comparisons) can be used.

If method 500 determines that the version number received in block 502 is invalid, method 500 can abort the update in block 508. In one embodiment, method 500 can abort by displaying an error message and either returning to a boot prompt or forcing a cold restart. In some embodiments, method 500 can reset the boot partition to the first partition to "reset" the state of booting to the default latest boot code image. In other embodiments, method 500 can keep the current boot priority to boot from the second partition again after rebooting.

If, however, method 500 determines that the version number received in block 502 is valid, method 500 can then read the server public key from the second partition in block 510. As discussed, the second partition can comprise a write-protected partition, and thus method 500 can presume that the server public key is secure and not tampered with.

In block 512, method 500 can confirm the signature received in block 502 using the server public key read in block 510. In one embodiment, method 500 can compute a hash of the update image and then use the public key to decrypt the signature and compare the decryption result with the locally generated hash to validate the digital signature.

In block 514, method 500 can determine if the signature is valid. If not, method 500 can abort the update in block 508. In one embodiment, method 500 can abort by displaying an error message and either returning to a boot prompt or forcing a cold restart. In some embodiments, method 500 can reset the boot partition to the first partition to "reset" the state of booting to the default latest boot code image. In other embodiments, method 500 can keep the current boot priority to boot from the second partition again after rebooting.

However, if method 500 confirms that the digital signature is valid, the method can, in block 516, replace the latest boot code image with the update image received in block 502. In an embodiment, method 500 can erase the current latest boot code image from the first partition and then write the update image to the first partition. As discussed in FIG. 4, after executing block 516, the computing system can change the boot partition (block 418) and reboot (block 422). As a result, a secure update image is then used to boot.

Figure 6:
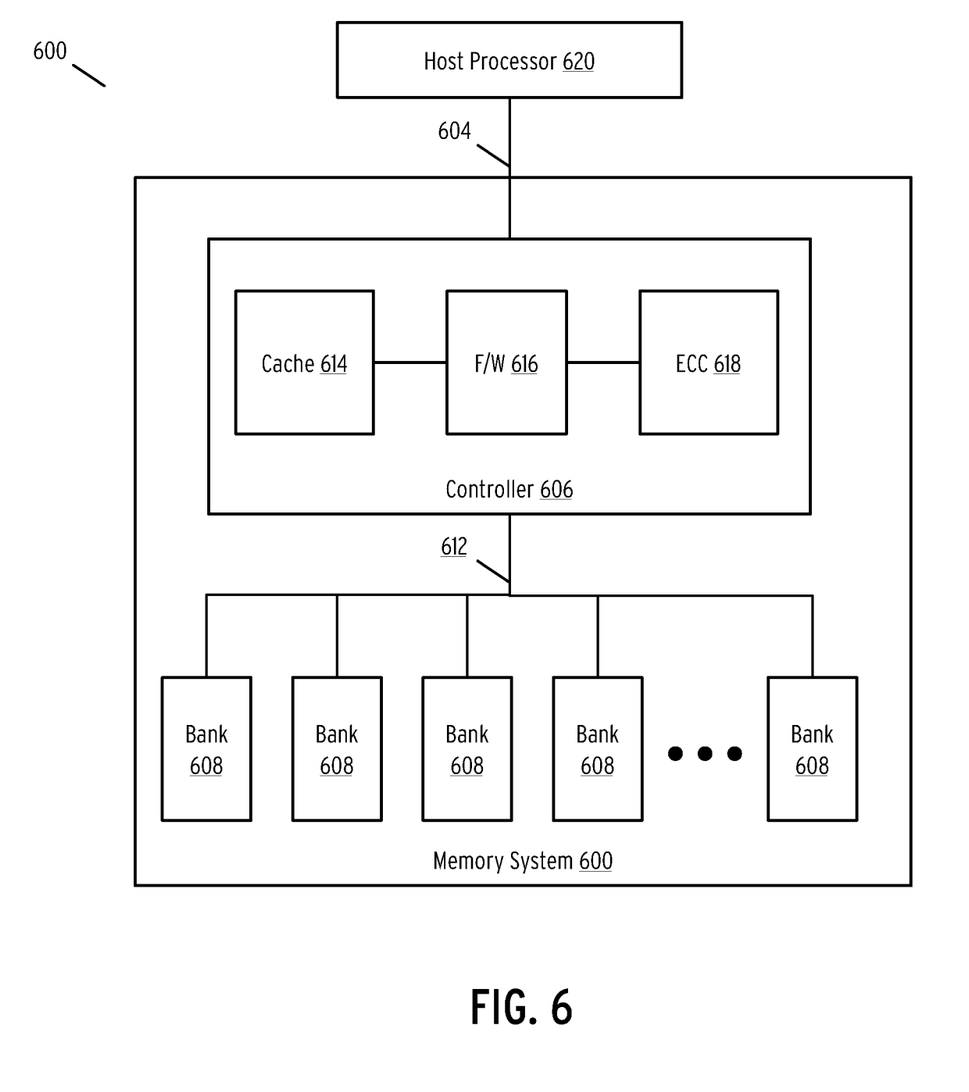
FIG. 6 is a block diagram illustrating a computing system according to some of the example embodiments.

FIG. 6 is a block diagram illustrating a computing system according to some of the example embodiments.

As illustrated in FIG. 6, a system includes a host processor 620 communicatively coupled to a memory system 600 via a bus 604. The memory system 600 comprises a controller 606 communicatively coupled to one or more memory banks 608 forming a memory array via a bus/interface 612. As illustrated, the controller 606 includes a local cache 614, firmware 616, and error correction code (ECC) circuitry (e.g., ECC module 618).

In the illustrated embodiment, host processor 620 can include any type of computer processor, such as a central processing unit (CPU), graphics processing unit (GPU), or other types of general-purpose or special-purpose computing devices. The host processor 620 includes one or more output ports that allow for the transmission of address, user, and control data between the host processor 620 and the memory system 600. In the illustrated embodiment, this communication is performed over bus 604. In one embodiment, bus 604 comprises an input/output (I/O) bus or a similar type of bus.

The memory system 600 is responsible for managing one or more memory banks 608. In one embodiment, the one or more memory banks 608 comprise NAND Flash dies or other configurations of non-volatile memory. In one embodiment, the one or more memory banks 608 comprise a memory array such as memory array.

The one or more memory banks 608 are managed by the controller 606. In some embodiments, the controller 606 comprises a computing device configured to mediate access to and from one or more memory banks 608. In one embodiment, the controller 606 comprises an ASIC or other circuitry installed on a printed circuit board housing the one or more memory banks 608. In some embodiments, the controller 606 may be physically separate from the one or more memory banks 608. The controller 606 communicates with the one or more memory banks 608 over the interface 612. In some embodiments, this interface 612 comprises a physically wired (e.g., traced) interface. In other embodiments, the interface 612 comprises a standard bus for communicating with one or more memory banks 608.

The controller 606 comprises various modules 614-618. In one embodiment, the various modules 614-618 comprise various physically distinct modules or circuits. In other embodiments, the modules 614-618 may completely (or partially) be implemented in software or firmware.

As illustrated, firmware 616 comprises the core of the controller and manages all operations of the controller 606. The firmware 616 may implement some or all of the methods described above. Specifically, the firmware 616 may implement the methods described in FIGS. 2 through 5.

Figure 7:
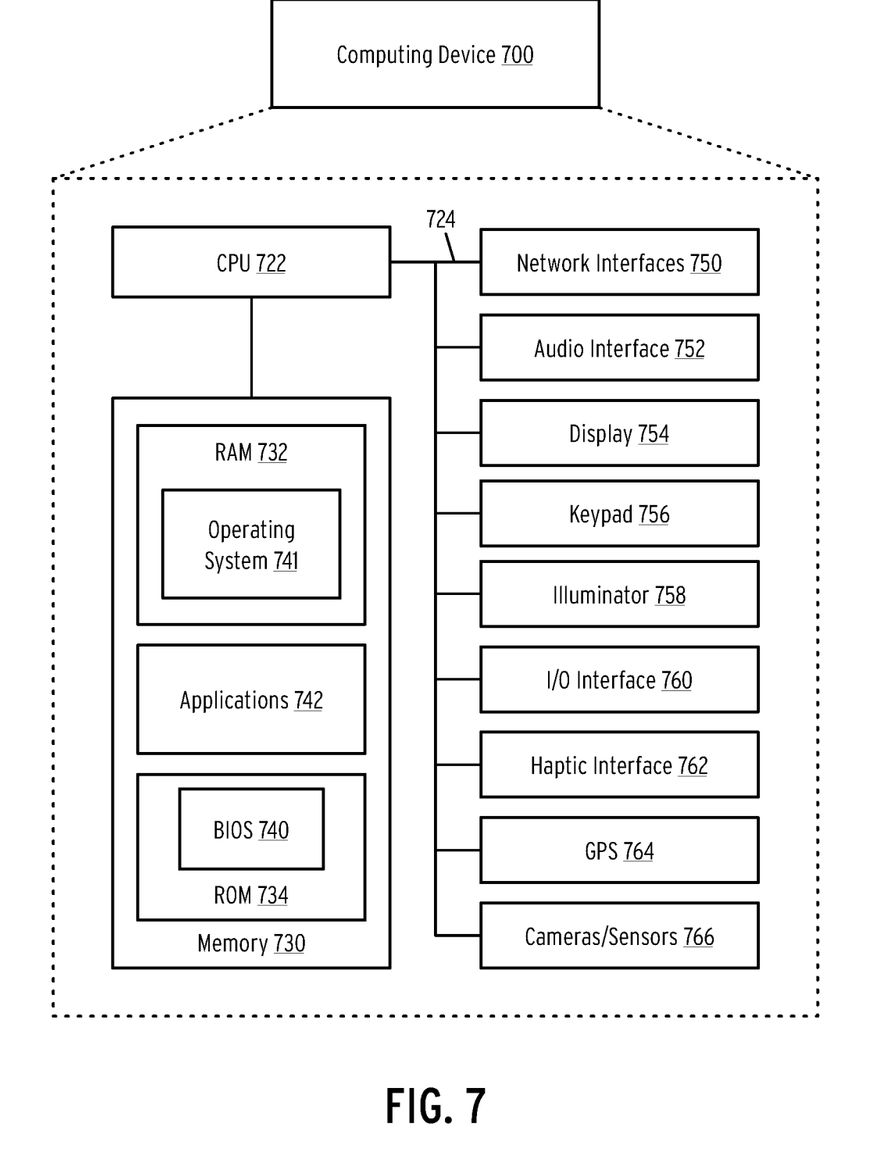
FIG. 7 is a block diagram illustrating a computing device according to some of the example embodiments.

FIG. 7 is a block diagram illustrating a computing device according to some of the example embodiments.

The computing device 700 may include more or fewer components than those shown in FIG. 7. For example, a server computing device may not include audio interfaces, displays, keypads, illuminators, haptic interfaces, GPS receivers, cameras, or sensors.

As shown in the figure, the computing device 700 includes a processing unit (CPU 722) in communication with a mass memory 730 via a bus 724. The computing device 700 also includes one or more network interfaces 750, an audio interface 752, a display 754, a keypad 756, an illuminator 758, an input/output interface 760, a haptic interface 762, an optional global positioning system (GPS) receiver, such as GPS receiver 764 and a camera(s) or other optical, thermal, or electromagnetic sensors (e.g., sensors 766). Computing device 700 can include sensors 766, as understood by those of skill in the art. The positioning of the sensors 766 on the computing device 700 can change per computing device 700 model, per computing device 700 capabilities, and the like, or some combination thereof.

The computing device 700 may optionally communicate with a base station (not shown) or directly with another computing device. One or more network interfaces 750 are sometimes known as a transceiver, transceiving device, or network interface card (NIC) devices.

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises input/output interface 760 for communicating with external devices, using communication technologies, such as USB, infrared, Bluetooth™, or the like. The haptic interface 762 provides tactile feedback to a user of the client device.

The GPS receiver 764 can determine the physical coordinates of the computing device 700 on the surface of the Earth, which typically outputs a location as latitude and longitude values. GPS receiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may, through other components, provide other information that may be employed to determine a physical location of the device, including, for example, a MAC address, Internet Protocol (IP) address, or the like.

Mass memory 730 includes a RAM 732, a ROM 734, and other storage means. Mass memory 730 illustrates another example of computer storage media for storage of information such as computer-readable instructions, data structures, program modules, or other data. Mass memory 730 stores a basic input/output system, such as BIOS 740, for controlling the low-level operation of the computing device 700. The mass memory also stores an operating system 741 for controlling the operation of the computing device 700

Applications 742 may include computer-executable instructions which, when executed by the computing device 700, perform any of the methods (or portions of the methods) described previously in the description of the preceding Figures. In some embodiments, the software or programs implementing the method embodiments can be read from hard disk drive (not illustrated) and temporarily stored in RAM 732 by CPU 722. CPU 722 may then read the software or data from RAM 732, process them, and store them to RAM 732 again.

The disclosure includes various devices which perform the methods and implement the systems described above, including data processing systems which perform these methods, and computer-readable media containing instructions which, when executed on data processing systems, cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to "one" or "an" embodiment in the present disclosure do not necessarily reference the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments, but not other embodiments.

In this description, various functions and operations may be described as being performed by or caused by software code to simplify description. However, those skilled in the art will recognize what is meant by such expressions is that the functions result from the execution of the code by one or more processors, such as a microprocessor, ASIC, graphics processor, or an FPGA. Alternatively, or in combination, the functions and operations can be implemented using special-purpose circuitry (e.g., logic circuitry), with or without software instructions. Embodiments can be implemented using hardwired circuitry without software instructions or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache, or a remote storage device.

Routines executed to implement the embodiments may be implemented as part of an operating system, middleware, service delivery platform, SDK (Software Development Kit) component, web services, or other specific application, component, program, object, module, or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places, including, for example, ROM, volatile RAM, non-volatile memory, or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or mobile devices, a user terminal, a vehicle, a personal communications device, a wearable digital device, an electronic kiosk, a general-purpose computer, an electronic document reader, a tablet, a laptop computer, a smartphone, a digital camera, a residential, domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., an FPGA, ASIC, etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

I claim:

1. A device comprising:
a memory device, the memory device including a storage array, the storage array comprising a first partition and a second partition, wherein the first partition comprises a writeable partition and the second partition comprises a write-protected partition; and
a processor configured to:
load a golden boot image from the second partition, display a boot prompt after loading the golden boot image,
receive an update boot image, the update boot image including a signature,
read a public key from the second partition,
validate the signature using the public key, and
replace a current boot image stored in the first partition with the update boot image.

2. The device of claim 1, wherein the memory device comprises an Embedded MultiMediaCard (eMMC) device.

3. The device of claim 1, wherein prior to loading the golden boot image, the processor is further configured to:
boot from the current boot image stored in the first partition;
display a second boot prompt in response to detecting a keypress while executing the current boot image;
receive a switch command via the second boot prompt;
set the second partition as a boot partition; and
initiate a device reset.

4. The device of claim 1, wherein the signature is generated based on contents of the update boot image and an update version number.

5. The device of claim 1, wherein the processor is further configured to:
read a current version number associated with the current boot image; and
determine that the current version number is less than an update version number associated with the update boot image prior to replacing the current boot image.

6. The device of claim 1, wherein the processor is further configured to receive an update command via the boot prompt, the update command including a filename associated with the update boot image.

7. The device of claim 6, wherein the filename comprises one of a local filename and a remote address.

8. The device of claim 1, wherein the processor is further configured to:
set the first partition as a boot partition after replacing the current boot image; and
initiate a device reset.

9. A method comprising:
loading a golden boot image from a write-protected partition of a storage array included in a memory device;
displaying a boot prompt after loading the golden boot image;
receiving an update boot image, the update boot image including a signature;
reading a public key from the write-protected partition;
validating the signature using the public key; and
replacing a current boot image stored in a writeable partition of the storage array, with the update boot image.

10. The method of claim 9, wherein prior to loading the golden boot image, the method further comprises:
booting from the current boot image stored in the writeable partition;
displaying a second boot prompt in response to detecting a keypress while executing the current boot image;
receiving a switch command via the second boot prompt;
setting the write-protected partition as a boot partition; and
initiating a device reset.

11. The method of claim 9, wherein the signature is generated based on contents of the update boot image and an update version number.

12. The method of claim 9, wherein the method further comprises:
reading a current version number associated with the current boot image; and
determining that the current version number is less than an update version number associated with the update boot image prior to replacing the current boot image.

13. The method of claim 9, wherein the method further comprises receiving an update command via the boot prompt, the update command including a filename associated with the update boot image.

14. The method of claim 13, wherein the filename comprises one of a local filename and a remote address.

15. The method of claim 9, wherein the method further comprises:
setting the writeable partition as a boot partition after replacing the current boot image; and
initiating a device reset.

16. A non-transitory computer-readable storage medium for tangibly storing computer program instructions capable of being executed by a computer processor, the computer program instructions defining steps of:
loading a golden boot image from a write-protected partition of a storage array included in a memory device;
displaying a boot prompt after loading the golden boot image;
receiving an update boot image, the update boot image including a signature;
reading a public key from the write-protected partition;
validating the signature using the public key; and
replacing a current boot image stored in a writeable partition of the storage array, with the update boot image.

17. The non-transitory computer-readable storage medium of claim 16, wherein prior to loading the golden boot image, the steps further comprise:
booting from the current boot image stored in the writeable partition;
displaying a second boot prompt in response to detecting a keypress while executing the current boot image;
receiving a switch command via the second boot prompt;
setting the write-protected partition as a boot partition; and
initiating a device reset.

18. The non-transitory computer-readable storage medium of claim 16, wherein the steps further comprise:
reading a current version number associated with the current boot image; and
determining that the current version number is less than an update version number associated with the update boot image prior to replacing the current boot image.

19. The non-transitory computer-readable storage medium of claim 16, wherein the steps further comprise receiving an update command via the boot prompt, the update command including a filename associated with the update boot image.

20. The non-transitory computer-readable storage medium of claim 16, wherein the steps further comprise:
setting the writeable partition as a boot partition after replacing the current boot image; and
initiating a device reset.

* * * * *